US012571318B1

(12) United States Patent
Wozney

(10) Patent No.: US 12,571,318 B1
(45) Date of Patent: Mar. 10, 2026

(54) AIRFOIL HAVING FLEX ELEMENTS WITH MULTI-DIMENSIONAL CURVATURE

(71) Applicant: GE Vernova Infrastructure Technology LLC, Greenville, SC (US)

(72) Inventor: Jordan Wozney, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/188,437

(22) Filed: Apr. 24, 2025

(51) Int. Cl.
*F01D 5/18* (2006.01)
*F01D 25/12* (2006.01)

(52) U.S. Cl.
CPC ............... *F01D 5/188* (2013.01); *F01D 5/18* (2013.01); *F01D 5/189* (2013.01); *F01D 25/12* (2013.01); *F05D 2260/201* (2013.01)

(58) Field of Classification Search
CPC . F01D 5/18; F01D 5/187; F01D 5/188; F01D 5/189; F01D 25/10; F05D 2260/201; F05D 2260/22141
See application file for complete search history.

(56) References Cited

U.S. PATENT DOCUMENTS 6,331,096 B1 12/2001 Burdgick et al.
8,109,724 B2 * 2/2012 Malecki .................. F01D 5/189 416/96 A
8,714,911 B2 5/2014 Giri et al.
9,388,700 B2 * 7/2016 Propheter-Hinckley ..................... F01D 5/187
10,210,356 B2 2/2019 Vechvittayakhlung
10,450,868 B2 * 10/2019 Jones ...................... F01D 5/145
10,577,947 B2 * 3/2020 Spangler ................. F01D 25/12
10,697,306 B2 * 6/2020 Lee ........................... F01D 9/02
10,914,179 B2 * 2/2021 Pardo ........................ F01D 9/02
11,028,702 B2 * 6/2021 Propheter-Hinckley ..................... F01D 5/189
11,614,233 B2 3/2023 Berry et al.
2017/0292407 A1 10/2017 Moga
2018/0274377 A1 * 9/2018 Kington .................. F01D 9/065
2020/0182069 A1 * 6/2020 Spangler ................. F01D 5/187

FOREIGN PATENT DOCUMENTS

WO WO-2024097458 A1 * 5/2024 ............. F01D 5/189

* cited by examiner

*Primary Examiner* — Sang K Kim
(74) *Attorney, Agent, or Firm* — Dority & Manning, P.A.

(57) ABSTRACT

An airfoil includes an airfoil body having a leading edge, a trailing edge, a suction side, and a pressure side. The airfoil body extends in a radial direction between a base end and a tip end, and the airfoil body defines a chamber. The airfoil further includes an impingement cooling structure positioned within the chamber. The impingement cooling structure includes an impingement wall that is spaced apart from the airfoil body such that a post-impingement cavity is defined between the impingement wall and the airfoil body. The impingement cooling structure further includes a plurality of flex elements that each extend from the impingement wall towards the chamber. At least one flex element of the plurality of flex elements include a main portion, a terminal portion, and an arcuate portion extending between the main portion and the terminal portion.

20 Claims, 8 Drawing Sheets

AIRFOIL HAVING FLEX ELEMENTS WITH MULTI-DIMENSIONAL CURVATURE

FIELD

The present disclosure relates generally to an airfoil for a turbine rotor blade or stationary nozzle having flex elements with a multi-dimensional curvature.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the gas turbine via the exhaust section.

During operation of the turbomachine, various hot gas path components in the system are subjected to high temperature flows, which can cause the hot gas path components to fail. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

Many complex cooling schemes use small cooling passages, or micro-channels, to deliver cooling fluid through the airfoil. Such cooling schemes present a considerable fabrication challenge for cores and castings, which can significantly increase the manufacturing cost of the hot gas path components using such known near wall cooling systems. To address the fabrication challenges with complex and/or small cooling channels near the component surface, many hot gas path components with such features may be additively manufactured. Additive manufacturing is capable of producing components with intricate and varied cooling features.

However, when the hot gas path component is formed by additive manufacturing, the airfoil body and the impingement insert are a single piece that is exposed to the hot gas path temperatures. As such, mitigating thermally driven low cycle fatigue (LCF) in such hot gas path components presents a challenge.

Accordingly, an improved hot gas path component having one or more features that improve strain relief, LCF, and is capable of being additively manufactured is desired and would be advantageous in the art.

BRIEF DESCRIPTION

Aspects and advantages of the airfoils and turbine sections in accordance with the present disclosure will be set forth in part in the following description, or may be obvious from the description, or may be learned through practice of the technology.

In accordance with one embodiment, an airfoil is provided. The airfoil includes an airfoil body having a leading edge, a trailing edge, a suction side extending between the leading edge and the trailing edge, and a pressure side extending between the leading edge and the trailing edge. The airfoil body extends in a radial direction between a base end and a tip end, and the airfoil body defines a chamber. The airfoil further includes an impingement cooling structure positioned within the chamber. The impingement cooling structure includes an impingement wall that is spaced apart from the airfoil body such that a post-impingement cavity is defined between the impingement wall and the airfoil body. The impingement cooling structure further includes a plurality of flex elements that each extend from the impingement wall towards the chamber. At least one flex element of the plurality of flex elements include a main portion extending at a first angle along the impingement wall, a terminal portion extending at a second angle along the impingement wall that is different than the first angle, and an arcuate portion extending between the main portion and the terminal portion.

In accordance with another embodiment, a turbine section is provided. The turbine section includes rotor blades and stationary nozzles. One of the rotor blades or the stationary nozzles includes an airfoil. The airfoil includes an airfoil body having a leading edge, a trailing edge, a suction side extending between the leading edge and the trailing edge, and a pressure side extending between the leading edge and the trailing edge. The airfoil body extends in a radial direction between a base end and a tip end, and the airfoil body defines a chamber. The airfoil further includes an impingement cooling structure positioned within the chamber. The impingement cooling structure includes an impingement wall that is spaced apart from the airfoil body such that a post-impingement cavity is defined between the impingement wall and the airfoil body. The impingement cooling structure further includes a plurality of flex elements that each extend from the impingement wall towards the chamber. At least one flex element of the plurality of flex elements include a main portion extending at a first angle along the impingement wall, a terminal portion extending at a second angle along the impingement wall that is different than the first angle, and an arcuate portion extending between the main portion and the terminal portion.

These and other features, aspects and advantages of the present airfoils and turbine sections will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present airfoils and turbine sections, including the best mode of making and using the present systems and methods, directed to one of ordinary skill in the art, is set forth in the specification, which makes reference to the appended figures, in which.

DETAILED DESCRIPTION

Figure 1:
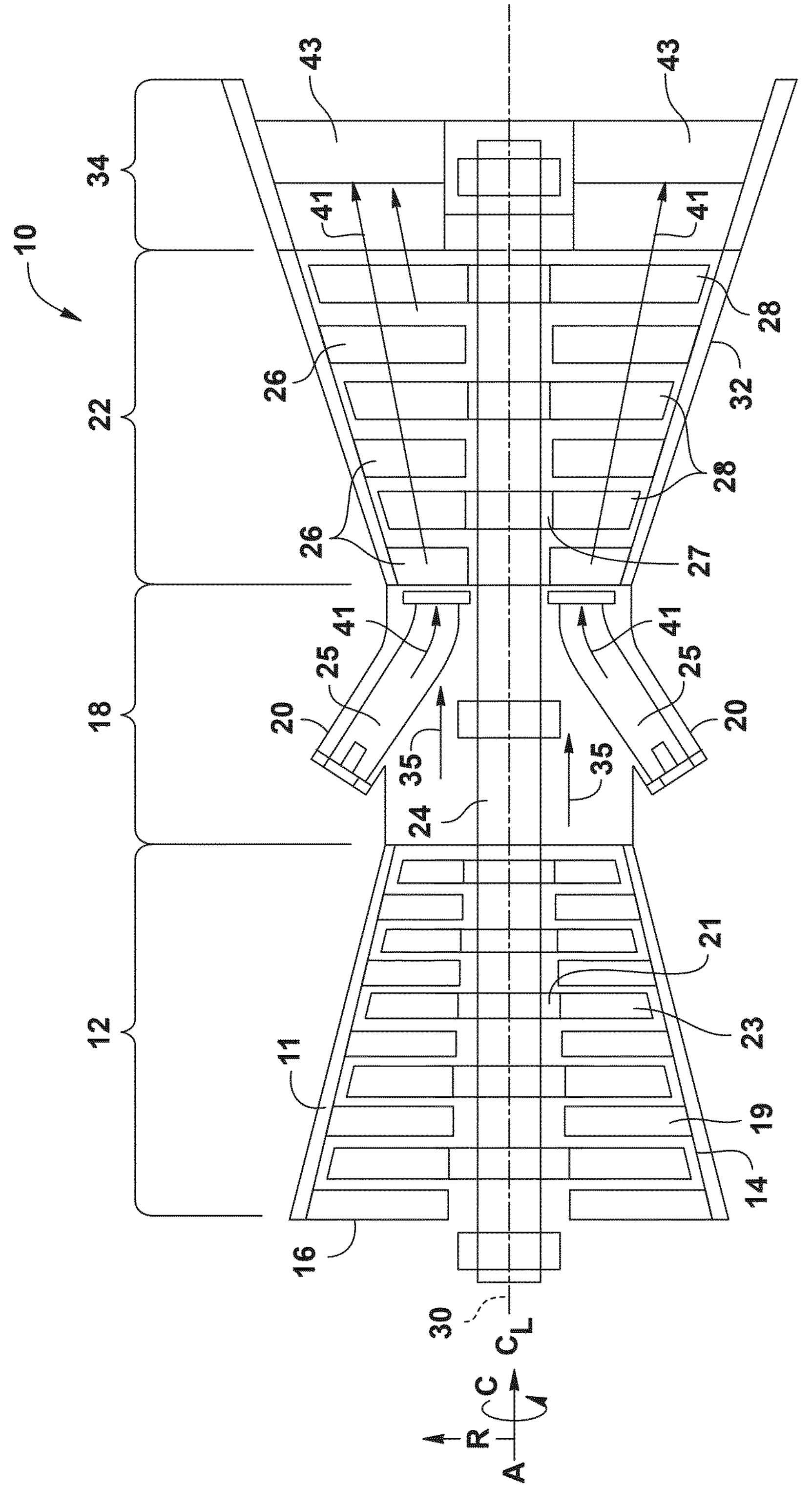
FIG. 1 is a schematic illustration of a turbomachine in accordance with embodiments of the present disclosure.

Reference now will be made in detail to embodiments of the present airfoils and turbine sections, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity.

The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The phrase "proximate to" refers to being closer to one end than an opposite end. For example, when used in conjunction with first and second ends; high pressure and low pressure sides; leading edge and trailing edge; base end and tip end; or the like, the phrase "proximate to the first end," or "proximate to the high pressure side," refers to a location closer to the first end than the second end, or closer to the high pressure side than the low pressure side, respectively.

Referring now to the drawings, FIG. 1 illustrates a schematic diagram of one embodiment of a turbomachine, which in the illustrated embodiment is a gas turbine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor section 12 includes an inlet 16 that is disposed at an upstream end of the gas turbine 10. The gas turbine 10 further includes a combustion section 18 having one or more combustors 20 disposed downstream from the compressor section 12. The gas turbine 10 further includes a turbine section 22 (i.e., an expansion turbine) that is downstream from the combustion section 18. A shaft 24 extends generally axially through the gas turbine engine 10 and couples the compressor section 12 and the turbine section 22.

The compressor section 12 may generally include a plurality of rotor disks 21 and a plurality of rotor blades 23 extending radially outwardly from and connected to each rotor disk 21. Each rotor disk 21 in turn may be coupled to or form a forward portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, the compressor section 12 includes stator vanes 19 disposed between the rotor blades 23. The stator vanes 19 may extend from and couple to a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form an aft portion of the shaft 24 that extends through the turbine section 22. The turbine section 22 further includes an outer casing 32 that circumferentially surrounds the aft portion of the shaft 24 and the rotor blades 28. The turbine section 22 may include stator vanes or stationary nozzles 26 extending radially inward from the outer casing 32. The rotor blades 28 and stator vanes 26 may be arranged in alternating fashion in stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air or other working fluid is drawn into the inlet 16 of the compressor 14 and is progressively compressed to provide a compressed air 35 to the combustion section 18. The compressed air 35 flows into the combustion section 18 and is mixed with fuel to form a combustible mixture. The combustible mixture is burned within a combustion chamber 25 of the combustor 20, thereby generating combustion gases 41 that flow from the combustion chamber 25 into the turbine section 22. Energy (kinetic and/or thermal) is transferred from the combustion gases 41 to the rotor blades 28, causing the shaft 24 to rotate and produce mechanical work. The spent combustion gases 41 (also called "exhaust gases") exit the turbine section 22 and flow through the exhaust diffuser 34 across a plurality of struts or main airfoils 43 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
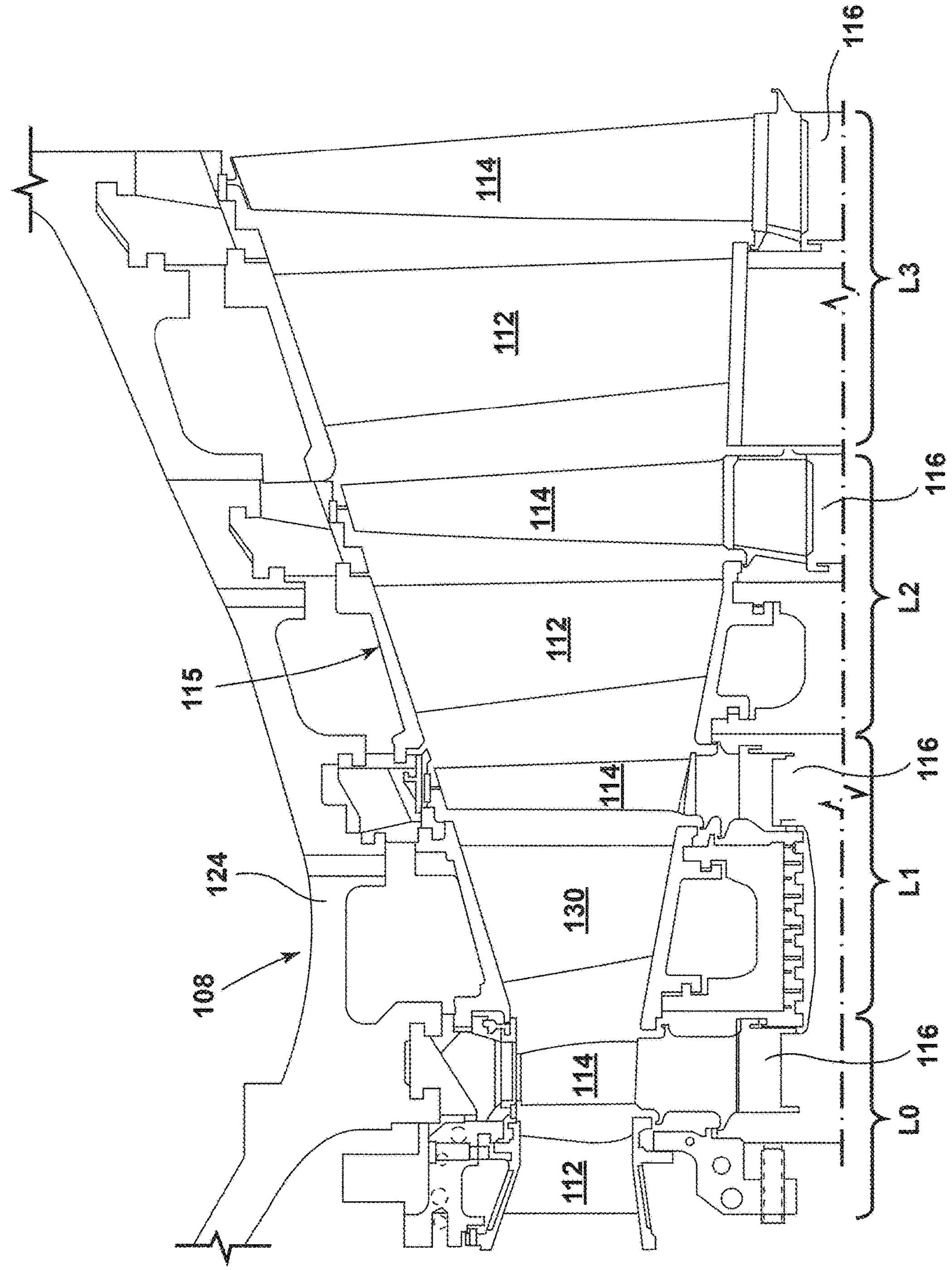
FIG. 2 illustrates a cross-sectional view of a portion of a turbine section of a turbomachine in accordance with embodiments of the disclosure.

Referring now to FIG. 2, a cross-sectional view of a portion of a turbine section 22 is illustrated in. In the example shown, turbine section 22 includes four stages L0-L3 that may be used with the gas turbine 10 described above with reference to FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages.

A plurality of stationary turbine vanes or nozzles 112 (hereafter "nozzle 112," or "nozzles 112") may cooperate with a plurality of rotating turbine blades 114 (hereafter "blade 114," or "blades 114") to form each stage L0-L3 of turbine section 22 and to define a portion of a working fluid path through turbine section 22. Blades 114 in each stage are coupled to shaft 24 (FIG. 1), e.g., by a respective rotor wheel 116 that couples them circumferentially to shaft 24 (FIG. 1). That is, blades 114 are mechanically coupled in a circumferentially spaced manner to shaft 24, e.g., by rotor wheels 116. A static nozzle section 115 includes a plurality of stationary nozzles 112 mounted to a casing 124 and circumferentially spaced around shaft 24 (FIG. 1). It is recognized that blades 114 rotate with shaft 24 (FIG. 1) and thus experience centrifugal force, while nozzles 112 are static.

Figure 3:
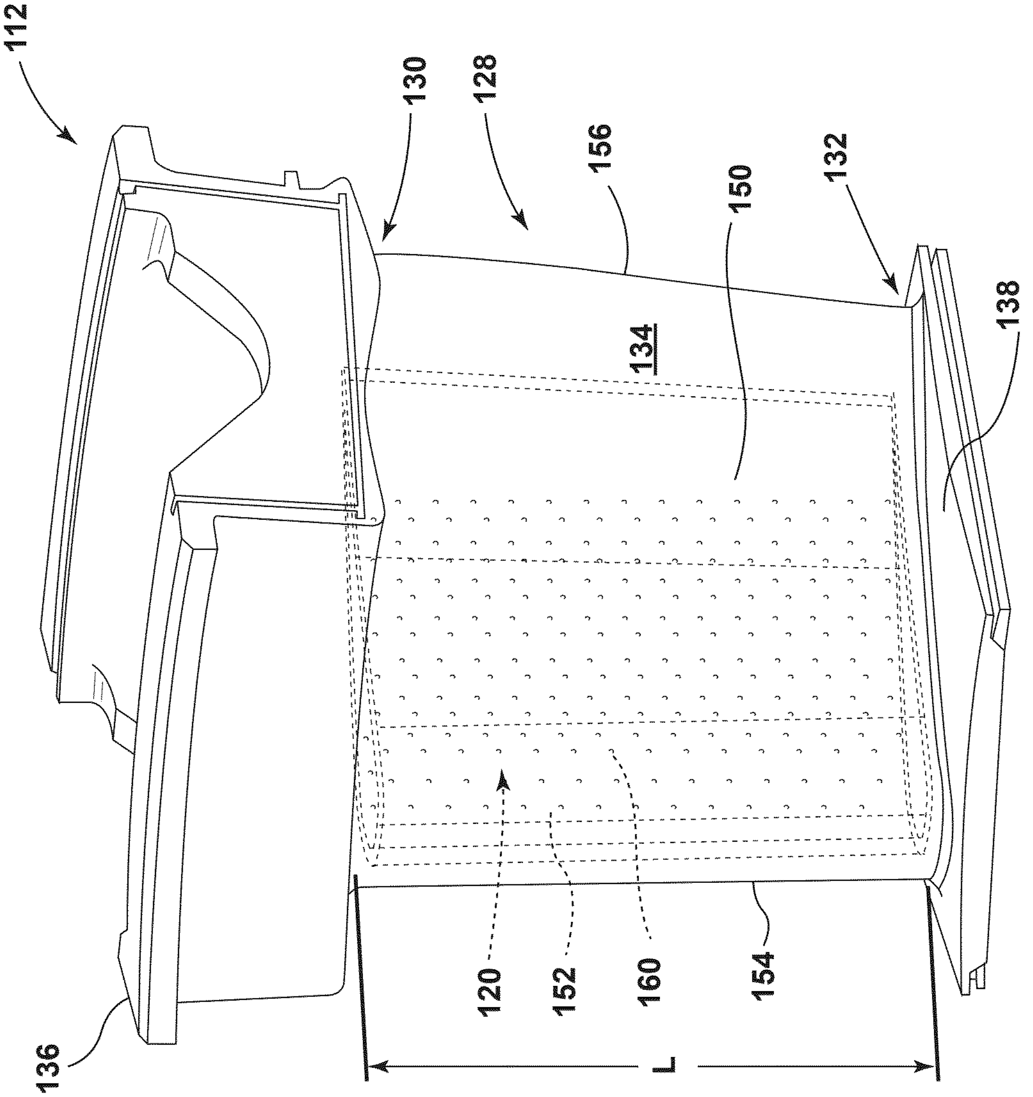
FIG. 3 illustrates a perspective view of a turbine nozzle including an impingement cooling structure in accordance with embodiments of the disclosure.
Figure 4:
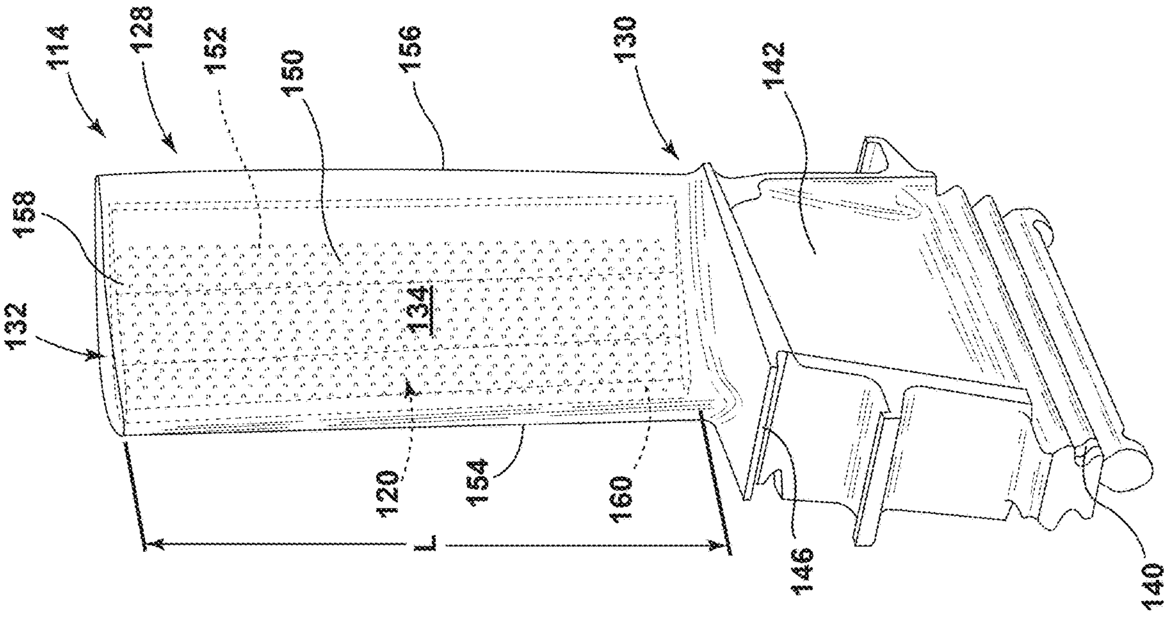
FIG. 4 illustrates a perspective view of a turbine rotor blade including an impingement cooling structure in accordance with embodiments of the disclosure.

Referring to FIGS. 3 and 4, perspective views, respectively, of a (stationary) nozzle 112 and a (rotating) blade 114 are illustrated in accordance with embodiments of the present disclosure. As shown, each nozzle 112 or blade 114 includes an airfoil 128 having a base end 130, a tip end 132, and an airfoil body 134 extending between base end 130 and tip end 132. As shown in FIG. 3, nozzle 112 includes an outer endwall 136 at tip end 132 and an inner endwall 138 at base end 130. Outer endwall 136 couples to casing 124 (FIG. 2). As shown in FIG. 4, blade 114 includes a dovetail 140 at base end 130 by which blade 114 attaches to a rotor wheel 116 (FIG. 2) of shaft 24 (FIG. 2). Base end 130 of blade 114 may further include a shank 142 that extends between dovetail 140 and a platform 146. Platform 146 is disposed at the junction of airfoil 134 and shank 142 and defines a portion of the inboard boundary of the working fluid path (FIG. 2) through turbine section 22.

It will be appreciated that airfoil body 134 in nozzle 112 and blade 114 is the active component of the nozzle 112 or blade 114 that intercepts the flow of working fluid and, in the case of blades 114, induces shaft 24 (FIG. 1) to rotate. It will be seen that airfoil body 134 of nozzle 112 and blade 114 includes a pressure side (PS) 150 (which may be concave) and a circumferentially or laterally opposite suction side (SS) 152 (which may be convex) extending axially between opposite leading and trailing edges 154, 156, respectively. Pressure side 150 and suction side 152 also extend in the radial direction R from base end 130 (i.e., outer endwall 136 for nozzle 112 and platform 146 for blade 114) to tip end 132 (i.e., inner endwall 138 for nozzle 112 and a tip end 158 for blade 114). Pressure side 150 and suction side 152 form, therebetween, a radially extending chamber 160, e.g., for receiving a flow of a coolant.

Note, in the example shown, blade 114 does not include a tip shroud; however, teachings of the disclosure are equally applicable to a blade including a tip shroud at tip end 158. Nozzle 112 and blade 114 shown in FIGS. 3-4 are illustrative only, and the teachings of the disclosure can be applied to a wide variety of nozzles and blades.

Figure 5:
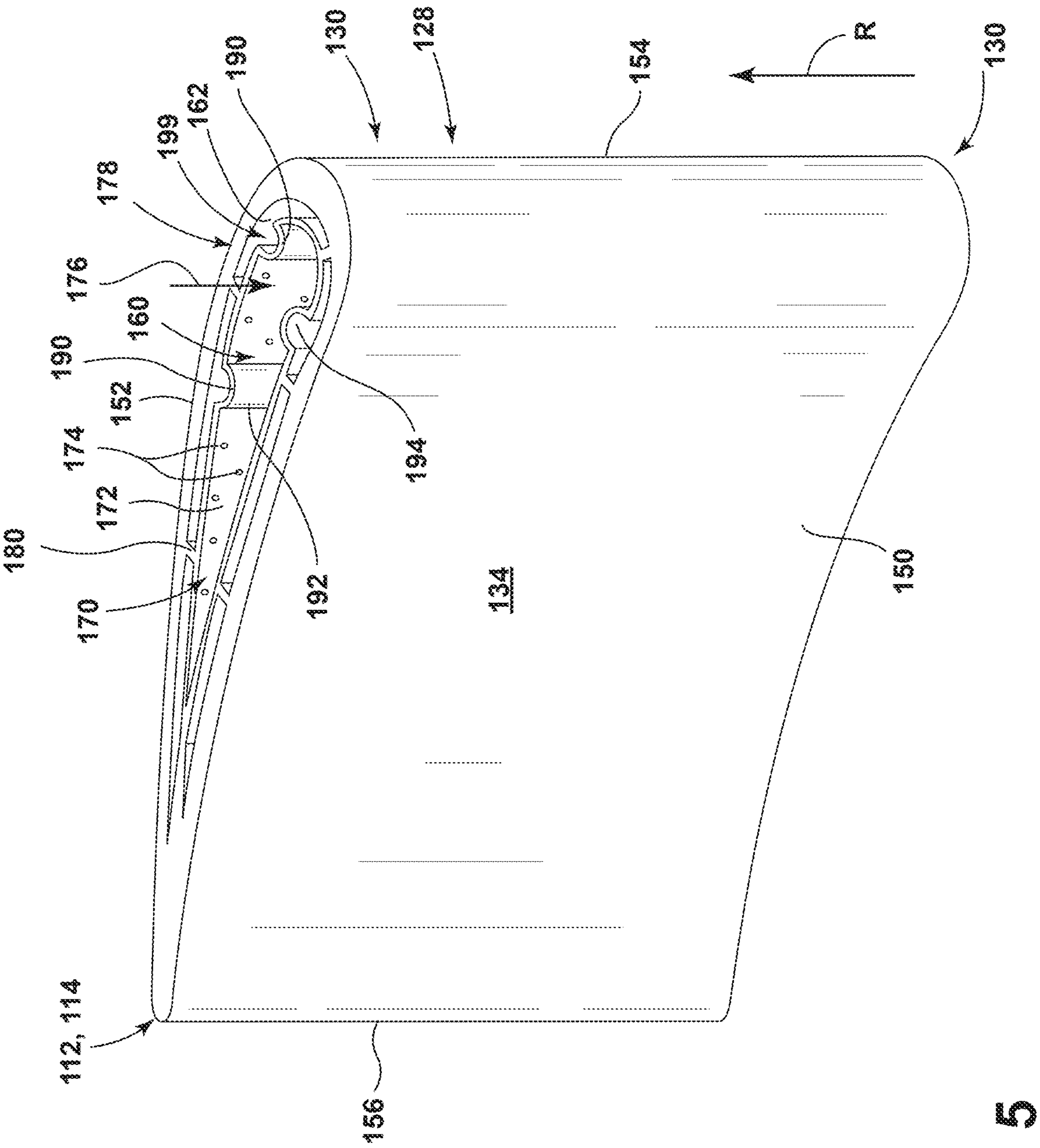
FIG. 5 shows a partial cross-sectional view of an airfoil in accordance with embodiments of the present disclosure.
Figure 6:
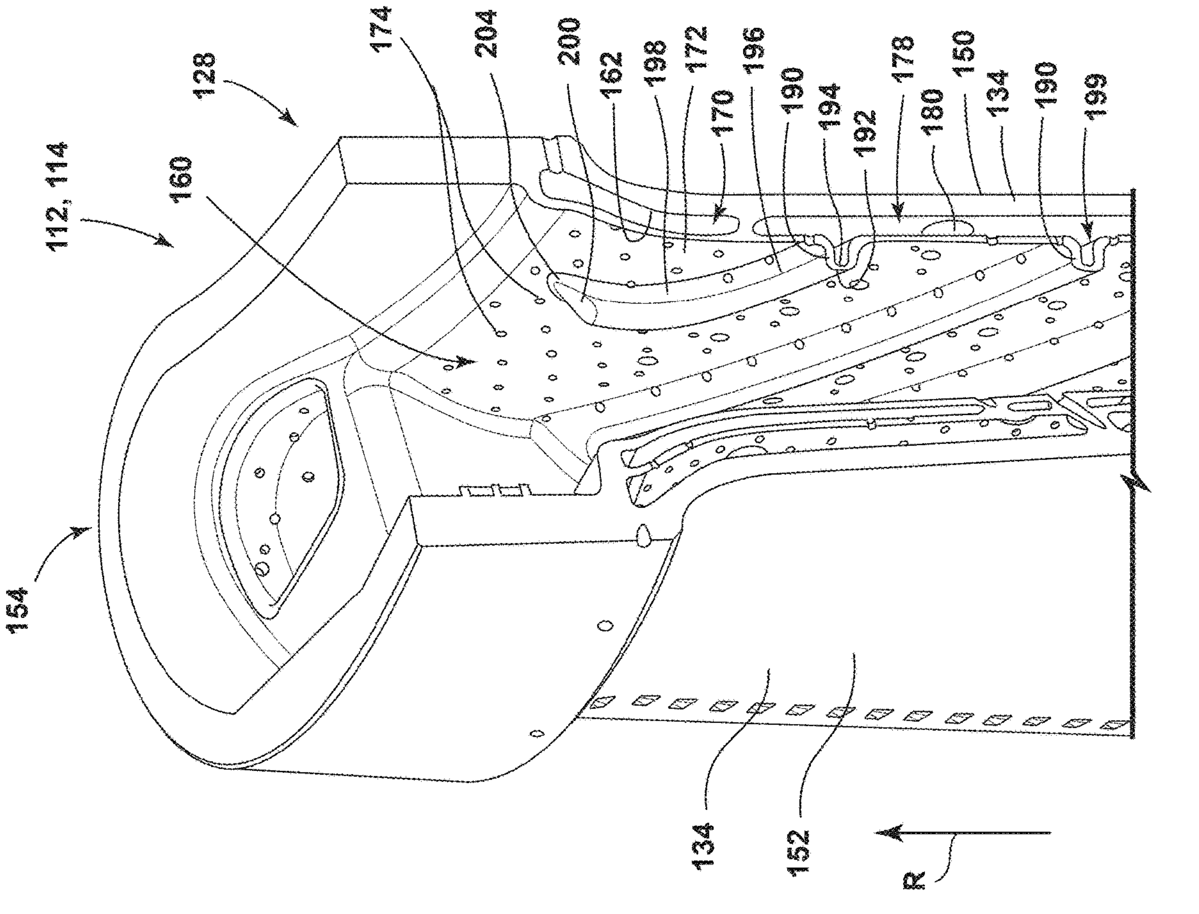
FIG. 6 illustrates a cross-sectional view of a portion of an airfoil, which includes an airfoil body and an impingement cooling structure positioned within the airfoil body, in accordance with embodiments of the present disclosure.
Figure 7:
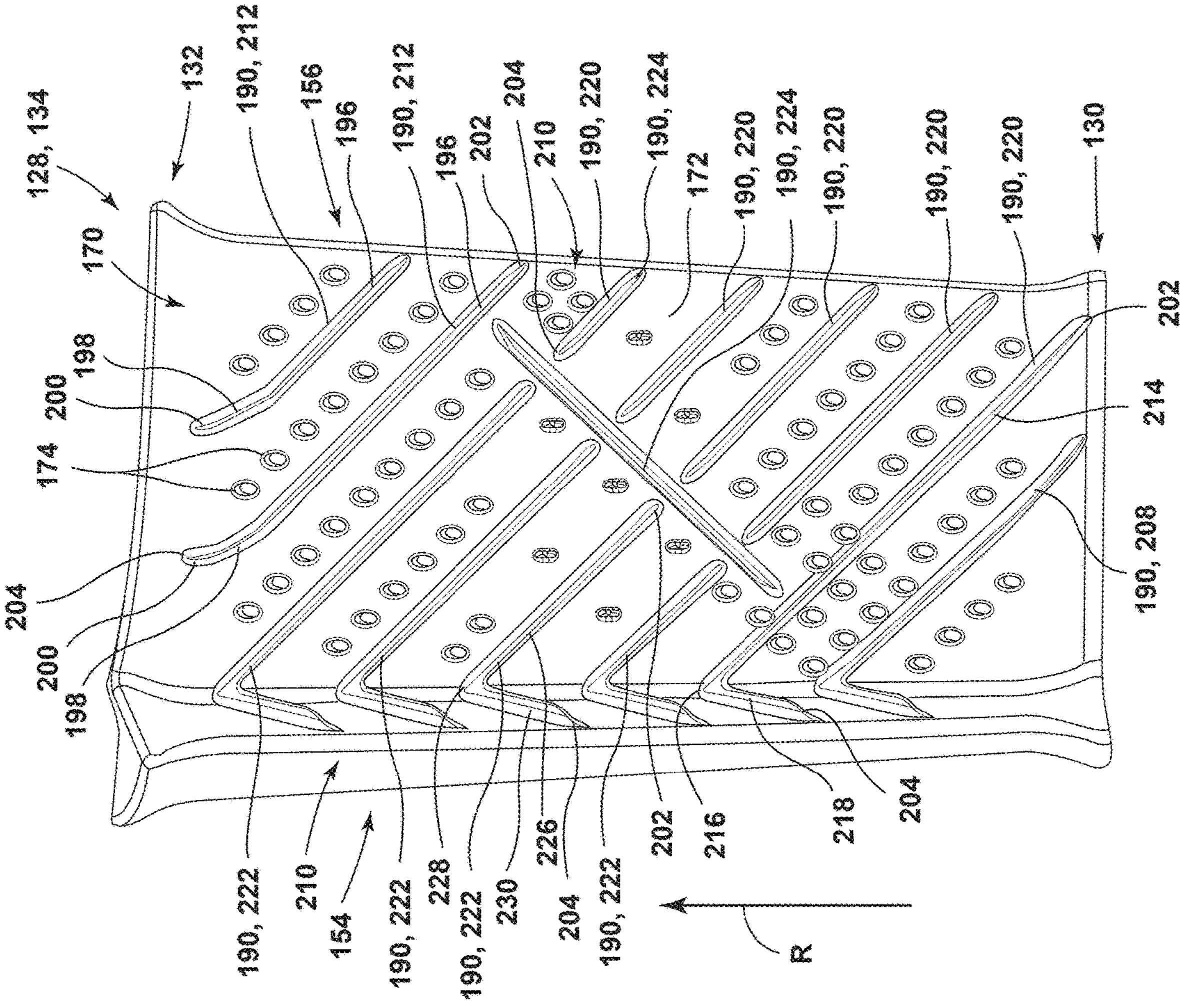
FIG. 7 illustrates a cross-sectional view of an airfoil showing an impingement cooling structure in accordance with embodiments of the present disclosure.
Figure 8:
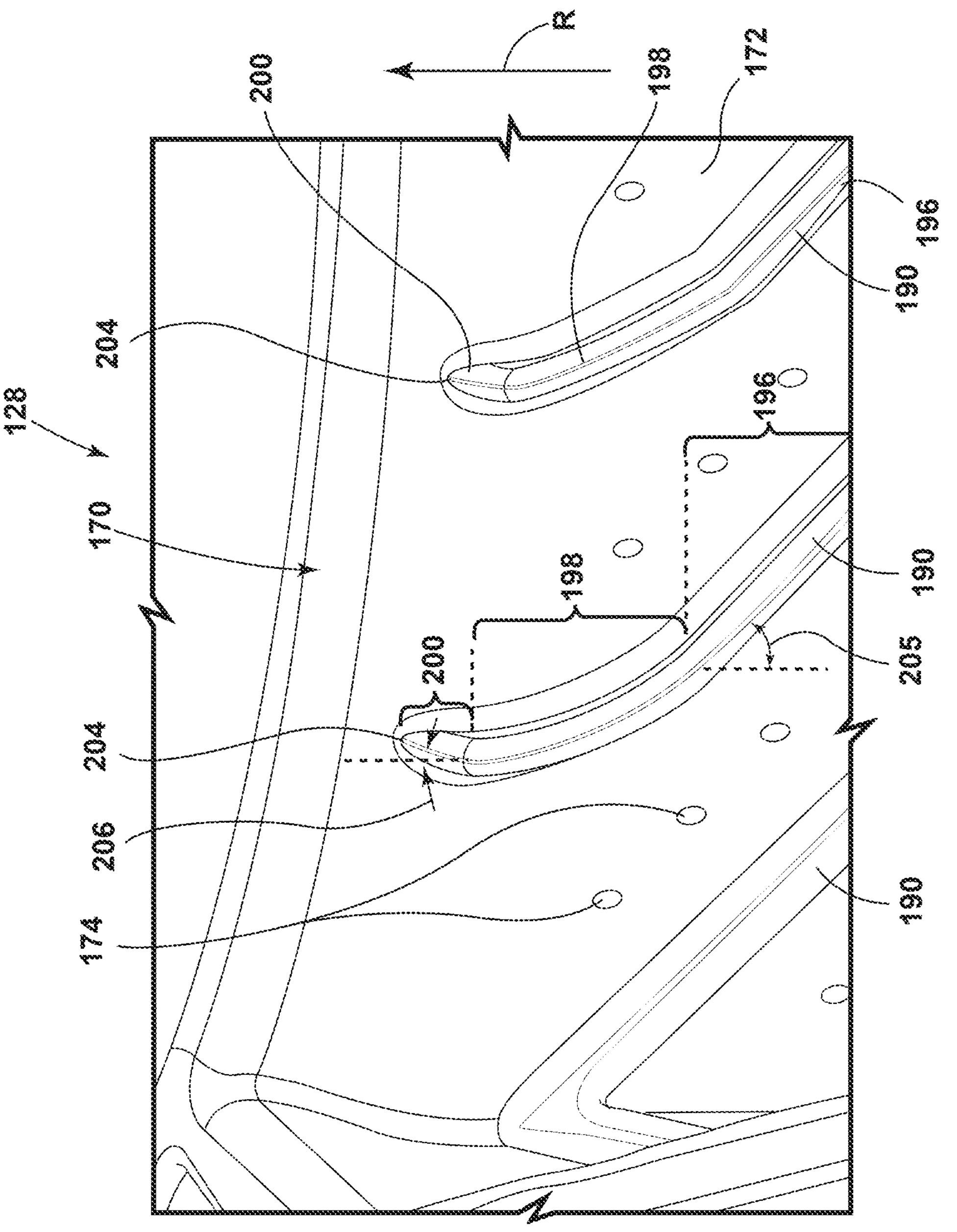
FIG. 8 illustrates an enlarged perspective view of the impingement cooling structure of the airfoil shown in FIG. 7 in accordance with embodiments of the present disclosure.

Referring now to FIGS. 5-8, various cross-sectional views of an airfoil 128, which may be included on the nozzle 112 or blade 114 described above with reference to FIGS. 3 and 4, are illustrated in accordance with embodiments of the present disclosure. Specifically, FIG. 5 illustrates a partial cross-sectional view of the airfoil 128. FIG. 6 illustrates a cross-sectional view of a portion of the airfoil 128, which includes an airfoil body 134 and an impingement cooling structure 170 positioned within the airfoil body 134. FIG. 7 illustrates a cross-sectional view of an airfoil 128 showing the impingement cooling structure 170 having the impingement wall 172 and a plurality of flex elements 190 in accordance with embodiments of the present disclosure. FIG. 8 illustrates an enlarged perspective view of the impingement cooling structure 170 of the airfoil 128 shown in FIG. 7 in accordance with embodiments of the present disclosure.

As shown, the airfoil 128 may include the impingement cooling structure 170 positioned within the radially extending chamber 160 (FIGS. 5 and 6). Impingement cooling structure 170 is a unitary, internal structure that is integrally formed with airfoil body 134. M ore particularly, airfoil body 134 and the impingement cooling structure 170 are formed together using additive manufacturing such that they include a plurality of integral material layers.

Impingement cooling structure 170 (hereafter "structure 170") includes an impingement wall 172 spaced from inner surface 162 of airfoil body 134. A plurality of apertures 174 are defined through impingement wall 172 such that a coolant supplied to radially extending chamber 160 can pass through apertures 174 to cool inner surface 162 of airfoil body 134. Impingement wall 172 is spaced from inner surface 162 of airfoil body 134 to define a post-impingement cavity 178 between impingement wall 172 and inner surface 162. Impingement wall 172 is a single wall structure, i.e., it is one piece.

The spacing between impingement wall 172 of structure 170 and inner surface 162 of airfoil body 134 may be user defined to ensure the desired cooling. One or more support members 180 may be provided to space impingement wall 172 from inner surface 162 of airfoil body 134. Support members 180 can be, for example, structural posts capable of holding impingement wall 172 in a desired position. Support members 180 may be arranged in rows. In another example, support members 180 can each be a structural rib capable of holding impingement wall 172 in a desired position. In the illustrated embodiment of FIG. 5, support members 180 may be generally parallel to thermal flex elements 190.

Structure 170 also includes a plurality of elongated thermal flex elements 190 defined in the impingement wall 172. As shown in FIG. 5, the plurality of elongated thermal flex elements 190 (hereafter "flex elements 190") are not solid ribs or supports that extend from a surface of structure 170, but rather are hollow structures or curvatures in the normally planar or sheet-like surface of impingement wall 172.

Each flex element 190 may define opposing surfaces 192, 194, which include a first surface 192 and a second surface 194. The first surface 192 faces radially extending chamber 160, and the second surface 194 faces inner surface 162 of airfoil body 134. Opposing surfaces 192, 194 of flex elements 190 are generally parallel. The second surface 194 may define a channel 199, which may be in fluid communication with the post-impingement cavity 178. The opposing surfaces 192, 194 are parallel to the extent possible using an appropriate additive manufacturing process and with some minor allowances for the desired rigidity and/or flexibility of flex elements 190 relative to the rest of impingement wall 172. Flex elements 190 extend, or protrude, inwardly towards radially extending chamber 160. As shown in FIG. 5, in some instances, support members 180 are located between flex elements 190. Flex elements 190 are referred to as 'elongated' because they have a generally linear extent about an interior of impingement wall 172 that is greater than their radial extent (relative to a radial length L of the airfoil 128). Impingement cooling apertures 174 can be arranged in any manner between adjacent flex element(s) 190 to accommodate the desired cooling of inner surface 162 and the location of flex element(s) 190 and/or support members 180.

Flex elements 190 provide thermal compliance for the integrally formed airfoil body 134 and impingement cooling structure 170. M ore particularly, flex elements 190 greatly reduce the thermally induced strain on the components as they are exposed to large thermal differences between hot combustion gases and an impingement coolant (e.g., coolant 176). Hence, nozzle 112 or blade 114 can be built robustly for high cycle fatigue (HCF), yet flexibly for low cycle fatigue (LCF). Flex elements 190 also allow for cost effective additive manufacturing of turbine nozzle 112 or blade 114 regardless of the anticipated temperature gradients they will be exposed to during use. Flex elements 190 also allow maintenance of normal aperture 174 spacing, and prevent breaking of support members 180, despite increased temperature gradients.

As shown in FIG. 5, the airfoil body 134 may include the leading edge 154 and the trailing edge 156 spaced apart from one another. Additionally, the airfoil body 134 includes the suction side 152 and the pressure side 150 each extending between the leading edge 154 and the trailing edge 156. Additionally, as shown in FIGS. 3, 4, and 7, the airfoil 128 and the airfoil body 134 may extend in the radial direction R between the base end 130 and a tip end 132.

As shown, the impingement cooling structure 170 includes the impingement wall 172 spaced apart from the airfoil body 134 (FIGS. 5 and 6) such that a post-impingement cavity 178 is defined between the impingement wall 172 and the airfoil body 134. Specifically, as shown in FIGS. 5 and 6, the airfoil body 134 may define the inner surface 162, and the impingement wall 172 may be spaced apart from the inner surface 162. As shown in FIGS. 5-8, the impingement wall 172 may define a plurality of impingement cooling apertures 174 that are each sized and oriented to cause a cooling fluid (e.g., air from the compressor section) to impinge upon the inner surface 162 to cool the airfoil body 134.

That is, the impingement apertures 174 may be sized and oriented to direct the pre-impingement coolant (e.g., air) in discrete jets to impinge upon the inner surface 162. The discrete jets of coolant impinge (or strike) the inner surface 162 and create a thin boundary layer of coolant over the inner surface 162, which allows for optimal heat transfer between the airfoil body 134 and the coolant. For example, in some embodiments, the impingement apertures 174 may orient pre-impingement coolant such that it is perpendicular to the surface upon which it strikes, e.g. the inner surface 162. Once the coolant has impinged upon the inner surface 162, it may be referred to as "post-impingement coolant" and/or "spent coolant" because the coolant has undergone an energy transfer and therefore has different characteristics. For example, the spent coolant may have a higher temperature and lower pressure than the pre-impingement coolant because the spent coolant has removed heat from the airfoil body 134 during the impingement process.

The plurality of flex elements 190 may each extend from the impingement wall 172 towards the chamber 160 (FIGS. 5 and 6). The plurality of flex elements 190 may each extend from the impingement wall 172 and may be arranged in a pattern. In many embodiments, the plurality of flex elements 190 may be spaced apart from one another in the radial direction R. For example, the plurality of flex elements 190 may be equally (or unequally) spaced apart from one another with respect to the radial direction R. As shown in FIGS. 6-8, flex elements 190 may extend in a direction at an angle a in a range of 30° to 60° relative to the radial direction R of the airfoil 128. In certain embodiments, flex elements 190 may extend in a direction at an angle a of about 45° to relative to the radial direction R of the airfoil 128.

Particularly, as shown in FIGS. 6-8, at least one flex element 190 of the plurality of flex elements 190 may include a main portion 196, a terminal portion 200, and a arcuate portion 198 extending between the main portion 196 and the terminal portion 200. More specifically, as shown, the main portion 196 may extend along the impingement wall 172 at a first angle 205 relative to the radial direction R. The terminal portion 200 may extend along the impingement wall 172 at a second angle 206 relative to the radial direction R. As shown, the second angle 206 is different (smaller) than the first angle 205. That is, both the main portion 196 and the terminal portion 200 may extend generally linearly at different angles along the impingement wall 172. The arcuate portion 198 may curve continuously as the arcuate portion extends along the impingement wall 172 between the main portion 196 and the terminal portion 200. As should be appreciated, the arcuate portion 198 may curve in as it extends between the main portion 196 and the terminal portion 200 in multiple dimensions (e.g., X, Y, and Z). That is, the arcuate portion 198 may curve in as it extends between the main portion 196 and the terminal portion 200 in all three dimensions or directions. For example, with reference to FIG. 8 and a mutually orthogonal coordinate system having X, Y, and Z directions, the arcuate portion 198 may curve as it extends between the main portion 196 and the terminal portion 200 in each of the X, Y, and Z directions (e.g., up and down, left and right, and into and out of the page with reference to FIG. 8). This three dimensional curvature may advantageously increase the strength of the terminal end of the flex element 190 when compared to prior designs.

The second angle 206 may be smaller than the first angle 205. For example, the second angle 206 may be about 10% of the first angle 205. Specifically, the first angle 205 at which the main portion 196 extends along the impingement wall 172 relative to the radial direction may be between about 30° and about 60°, or such as between about 40° and about 50°, or such as about 45°. Additionally, the second angle 206 at which the terminal portion 200 extends along the impingement wall 172 relative to the radial direction may be between about 0° and about 10°, or such as between about 0° and about 5°, or such as about 0°.

With respect to the radial direction R, both the terminal portion 200 and the arcuate portion 198 may be disposed outwardly of the main portion 196. In other words, arcuate portion 198 may be disposed radially outwardly of the main portion 196, and the terminal portion 200 may be disposed radially outwardly of the arcuate portion 198. The terminal portion 200 may be the radially outwardmost portion of the flex element 190 and disposed closest to the tip end 132 of any portion of any of the flex elements 190.

As shown best in FIG. 7, the at least one flex element 190 that includes the arcuate portion 198 may be the two radially outermost flex elements 190 of the plurality of flex elements 190. That is, the at least one flex element 190 that includes the arcuate portion 198 may be proximate the tip end 132 of the airfoil 128. More particularly, the at least one flex element 190 that includes the arcuate portion 198 may be closer to the tip end 132 than the base end 130.

As shown in FIG. 7, the plurality of flex elements 190 may include a base group 208 of flex elements 190, an intermediate group 210 of flex elements 190, and a tip group 212 of flex elements 190. The base group 208 of flex elements may be proximate the base end 130 of the airfoil body 134. The base group 208 of flex elements 190 may be the radially inwardmost group of flex elements 190. The tip group 212 of flex elements 190 may be proximate the tip end 132 of the airfoil body 134. The tip group 212 of flex elements 190 may be the radially outermost group of flex elements 190. The intermediate group 210 of flex elements 190 may be disposed between (e.g., radially between) the base group 208 of flex elements 190 and the tip group 212 of flex elements 190 with respect to the radial direction R.

Each flex element 190 of the plurality of flex elements 190 may extend between a first end 202 and a second end 204 radially outward of the first end 202. That is, the second end 204 may be disposed radially outwardly of the first end 202. At the first end 202 and the second end 204 of each flex element 190, the flex element 190 may smoothly and continuously taper back into the impingement wall 172. Each of the flex elements 190 may extend from the first end 202 towards the leading edge 154 to the second end 204.

As shown in FIG. 7, each flex element 190 in the base group 208 of flex elements 190 may include a base main portion 214, a base corner portion 216, and a base secondary portion 218. The base main portion 214 may extend radially outwardly from the first end 202 to the base corner portion 216. At the base corner portion 216, each flex element 190 in the base group 208 of flex elements 190 may reverse directions and extend radially inwardly. For example, each flex element 190 in the base group 208 of flex elements 190 may extend radially inwardly from the base corner portion 216 to the second end 204. The base corner portion 216 may be the radially outermost portion of the flex elements 190 in the base group of flex elements 190. The base corner portion 216 and the base secondary portion 218 may be disposed closer to the leading edge 154 than the trailing edge 156. The base secondary portion 218 and the base main portion 214 may be generally perpendicular to one another and may each be angled at between about 30° and about 60° relative to the radial direction R.

In exemplary embodiments, the impingement cooling structure 170 may further include a cross flex element 224 positioned between (e.g., radially between) the base group 208 of flex elements 190 and the tip group 212 of flex elements 190. The cross flex element 224 may extend linearly along the impingement wall 172 in a direction that is perpendicular to the main portion 196 of the flex elements 190 in the tip group 212 of flex elements 190. The main portion 196 of the flex elements 190 in the tip group 212 and the cross flex element 224 may be generally perpendicular to one another and may each be angled at between about 30° and about 60° relative to the radial direction R.

In many embodiments, as shown in FIG. 7, the intermediate group 210 of flex elements 190 may include trailing edge flex elements 220 and leading edge flex elements 222. The trailing edge flex elements 220 may each extend from the first end 202 proximate the trailing edge 156 to the second end 204 on a first side of the cross flex element 224. The leading edge flex elements 222 may each extend from the first end 202 on a second side of the cross flex element 224 to a second end 204 proximate the leading edge 154. In other words, the cross flex element 224 may be positioned between (e.g., radially between) the second end 204 of the trailing edge flex elements 220 and the first end 202 of the leading edge flex elements 222.

As shown in FIG. 7, the trailing edge flex elements 220 may be entirely linear along the impingement wall 172 as the trailing edge flex elements 220 extend between the respective first end 202 and the second end 204. The trailing edge flex elements 220 may be angled at between about 30° and about 60° relative to the radial direction R.

Each leading edge flex element 222 may include a leading edge main portion 226, a leading edge corner portion 228, and a leading edge secondary portion 230. The leading edge main portion 226 may extend radially outwardly from the first end 202 to the leading edge corner portion 228. At the leading edge corner portion 228, each of the leading edge flex elements 222 may reverse directions and extend radially inwardly. For example, each of the leading edge flex elements 222 may extend radially inwardly from the leading edge corner portion 228 to the second end 204. The leading edge corner portion 228 may be the radially outermost portion of the leading edge flex element 222. The leading edge corner portion 228 and the leading edge secondary portion 230 may be disposed closer to the leading edge 154 than the trailing edge 156. The leading edge secondary portion 230 and the leading edge main portion 226 may be generally perpendicular to one another and may each be angled at between about 30° and about 60° relative to the radial direction R.

In exemplary embodiments, as shown in FIG. 7, each flex element 190 in the tip group 212 of flex elements 190 may include the main portion 196, the terminal portion 200, and the arcuate portion 198 described above. The main portion 196 may extend from the first end 202 to the arcuate portion 198. The arcuate portion 198 may extend between, and continuously curve between, the main portion 196 and the terminal portion 200. The terminal portion 200 may extend from the arcuate portion 198 to the second end 204.

As shown, the cross flex element 224 may be positioned between (e.g., radially between) the trailing edge flex elements 220 and the leading edge flex elements 222 in the intermediate group 210 of flex elements 190. The cross flex element 224 may extend generally perpendicularly to the flex elements 190 in the intermediate group 210 of flex elements 190. Specifically, the cross flex element 224 may extend along the impingement wall 172 generally perpendicularly to each of the following: the trailing edge flex element 220, the leading edge main portion 226 of the leading edge flex elements 222, the main portion 196 of the flex elements 190 in the tip group 212, and the base main portion 214 of the flex elements 190 in the base group 208.

In many embodiments, the airfoil 128 described herein may be integrally formed as a single component. That is, each of the subcomponents, e.g., the airfoil body 134 and the impingement cooling structure 170, and any other subcomponent of the airfoil 128, may be manufactured together as a single body. In exemplary embodiments, this may be done by utilizing an additive manufacturing system and method, such as direct metal laser sintering (DM LS), direct metal laser melting (DMLM), or other suitable additive manufacturing techniques. In other embodiments, other manufacturing techniques, such as casting or other suitable techniques, may be used. In this regard, by utilizing additive manufacturing methods, the [insert component] may be integrally formed as a single piece of continuous metal and may thus include fewer sub-components and/or joints compared to prior designs. The integral formation of the airfoil 128 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

As should be appreciated, the arcuate portion 198 of the flex elements 190 and the cross flex element 224 described herein advantageously improves strain relief and reduces LCF of the airfoil 128. This prolongs the life of the airfoil 128 and allows for operation at higher temperatures for longer durations than would otherwise be possible. Additionally, all the features of the flex elements 190, including the arcuate portion 198, are capable of being additively manufactured with the airfoil 128, which reduces manufacturing costs and considerations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

An airfoil comprising: an airfoil body having a leading edge, a trailing edge, a suction side extending between the leading edge and the trailing edge, and a pressure side extending between the leading edge and the trailing edge, the airfoil body extending in a radial direction between a base end and a tip end, the airfoil body defining a chamber; and an impingement cooling structure positioned within the chamber, the impingement cooling structure including: an impingement wall spaced apart from the airfoil body such that a post-impingement cavity is defined between the impingement wall and the airfoil body; and a plurality of flex elements extending from the impingement wall towards the chamber, wherein at least one flex element of the plurality of flex elements include a main portion extending at a first angle along the impingement wall, a terminal portion extending at a second angle along the impingement wall that is different than the first angle, and an arcuate portion extending between the main portion and the terminal portion.

The airfoil as in any preceding clause, wherein each flex element of the plurality of flex elements define opposing surfaces including a first surface that faces the chamber and a second surface that faces the post-impingement cavity, wherein the second surface of each flex element defines a channel.

The airfoil as in any preceding clause, wherein the first angle is between about 30° and about 60°, and wherein the second angle is between about 0° and about 10°.

The airfoil as in any preceding clause, wherein the plurality of flex elements are spaced apart from one another in the radial direction.

The airfoil as in any preceding clause, wherein the plurality of flex elements include a base group of flex elements proximate the base end of the airfoil body, a tip group of flex elements proximate the tip end of the airfoil body, and an intermediate group of flex elements disposed between the base group and the tip group with respect to the radial direction.

The airfoil as in any preceding clause, wherein each flex element in the base group of flex elements includes a base main portion and a base corner portion.

The airfoil as in any preceding clause, wherein the intermediate group of flex elements include trailing edge flex elements and leading edge flex elements.

The airfoil as in any preceding clause, wherein each flex element in the tip group of flex elements includes the main portion, the terminal portion, the arcuate portion.

The airfoil as in any preceding clause, wherein the impingement cooling structure further comprises a cross flex element positioned between the trailing edge flex elements and the leading edge flex elements in the intermediate group of flex elements, the cross flex element extending generally perpendicularly to each flex element in the intermediate group of flex elements.

The airfoil as in any preceding clause, wherein the leading edge flex elements include a leading edge main portion and a leading edge corner portion.

The airfoil as in any preceding clause, wherein the airfoil is integrally formed.

A turbine section of a gas turbine, the turbine section comprising: rotor blades; and stationary nozzles, wherein one of the rotor blades or the stationary nozzles includes an airfoil, the airfoil comprising: an airfoil body having a leading edge, a trailing edge, a suction side extending between the leading edge and the trailing edge, and a pressure side extending between the leading edge and the trailing edge, the airfoil body extending in a radial direction between a base end and a tip end, the airfoil body defining a chamber; and an impingement cooling structure positioned within the chamber, the impingement cooling structure including: an impingement wall spaced apart from the airfoil body such that a post-impingement cavity is defined between the impingement wall and the airfoil body; and a plurality of flex elements extending from the impingement wall towards the chamber, wherein at least one flex element of the plurality of flex elements include a main portion extending at a first angle along the impingement wall, a terminal portion extending at a second angle along the impingement wall that is different than the first angle, and an arcuate portion extending between the main portion and the terminal portion.

The turbine section as in any preceding clause, wherein each flex element of the plurality of flex elements define opposing surfaces including a first surface that faces the chamber and a second surface that faces the post-impingement cavity, wherein the second surface of each flex element defines a channel.

The turbine section as in any preceding clause, wherein the first angle is between about 30° and about 60°, and wherein the second angle is between about 0° and about 10°.

The turbine section as in any preceding clause, wherein the plurality of flex elements are spaced apart from one another in the radial direction.

The turbine section as in any preceding clause, wherein the plurality of flex elements include a base group of flex elements proximate the base end of the airfoil body, a tip group of flex elements proximate the tip end of the airfoil body, and an intermediate group of flex elements disposed between the base group and the tip group with respect to the radial direction.

The turbine section as in any preceding clause, wherein each flex element in the base group of flex elements includes a base main portion and a base corner portion.

The turbine section as in any preceding clause, wherein the intermediate group of flex elements include trailing edge flex elements and leading edge flex elements.

The turbine section as in any preceding clause, wherein each flex element in the tip group of flex elements includes the main portion, the terminal portion, the arcuate portion.

The turbine section as in any preceding clause, wherein the impingement cooling structure further comprises a cross flex element positioned between the trailing edge flex elements and the leading edge flex elements in the intermediate group of flex elements, the cross flex element extending generally perpendicularly to each flex element in the intermediate group of flex elements.

What is claimed is:

1. An airfoil comprising:

an airfoil body having a leading edge, a trailing edge, a suction side extending between the leading edge and the trailing edge, and a pressure side extending between the leading edge and the trailing edge, the airfoil body extending in a radial direction between a base end and a tip end, the airfoil body defining a chamber; and an impingement cooling structure positioned within the chamber, the impingement cooling structure including:

an impingement wall spaced apart from the airfoil body such that a post-impingement cavity is defined between the impingement wall and the airfoil body; and a plurality of flex elements extending from the impingement wall towards the chamber, wherein at least one flex element of the plurality of flex elements include a main portion extending at a first angle relative to the radial direction along the impingement wall, a terminal portion extending at a second angle relative to the radial direction along the impingement wall that is different than the first angle, and an arcuate portion that curves as the arcuate portion extends between the main portion and the terminal portion in three mutually orthogonal directions.

2. The airfoil as in claim 1, wherein each flex element of the plurality of flex elements define opposing surfaces including a first surface that faces the chamber and a second surface that faces the post-impingement cavity, wherein the second surface of each flex element defines a channel.

3. The airfoil as in claim 1, wherein the first angle is between about 30° and about 60°, and wherein the second angle is between about 0° and about 10°.

4. The airfoil as in claim 1, wherein the plurality of flex elements are spaced apart from one another in the radial direction.

5. The airfoil as in claim 1, wherein the plurality of flex elements include a base group of flex elements proximate the base end of the airfoil body, a tip group of flex elements proximate the tip end of the airfoil body, and an intermediate group of flex elements disposed between the base group and the tip group with respect to the radial direction.

6. The airfoil as in claim 5, wherein each flex element in the base group of flex elements includes a base main portion and a base corner portion.

7. The airfoil as in claim 5, wherein the intermediate group of flex elements include trailing edge flex elements and leading edge flex elements.

8. The airfoil as in claim 5, wherein only the flex elements in the tip group of flex elements includes the main portion, the terminal portion, the arcuate portion.

9. The airfoil as in claim 7, wherein the impingement cooling structure further comprises a cross flex element positioned between the trailing edge flex elements and the leading edge flex elements in the intermediate group of flex elements, the cross flex element extending generally perpendicularly to each flex element in the intermediate group of flex elements.

10. The airfoil as in claim 7, wherein the leading edge flex elements include a leading edge main portion and a leading edge corner portion.

11. The airfoil as in claim 1, wherein the airfoil is integrally formed.

12. A turbine section of a gas turbine, the turbine section comprising:
- rotor blades; and
- stationary nozzles, wherein one of the rotor blades or the stationary nozzles includes an airfoil, the airfoil comprising:
  - an airfoil body having a leading edge, a trailing edge, a suction side extending between the leading edge and the trailing edge, and a pressure side extending between the leading edge and the trailing edge, the airfoil body extending in a radial direction between a base end and a tip end, the airfoil body defining a chamber; and
  - an impingement cooling structure positioned within the chamber, the impingement cooling structure including:
    - an impingement wall spaced apart from the airfoil body such that a post-impingement cavity is defined between the impingement wall and the airfoil body; and
    - a plurality of flex elements extending from the impingement wall towards the chamber, wherein at least one flex element of the plurality of flex elements include a main portion extending at a first angle relative to the radial direction along the impingement wall, a terminal portion extending at a second angle relative to the radial direction along the impingement wall that is different than the first angle, and an arcuate portion that curves as the arcuate portion extends between the main portion and the terminal portion in three mutually orthogonal directions.

13. The turbine section as in claim 12, wherein each flex element of the plurality of flex elements define opposing surfaces including a first surface that faces the chamber and a second surface that faces the post-impingement cavity, wherein the second surface of each flex element defines a channel.

14. The turbine section as in claim 12, wherein the first angle is between about 30° and about 60°, and wherein the second angle is between about 0° and about 10°.

15. The turbine section as in claim 12, wherein the plurality of flex elements are spaced apart from one another in the radial direction.

16. The turbine section as in claim 12, wherein the plurality of flex elements include a base group of flex elements proximate the base end of the airfoil body, a tip group of flex elements proximate the tip end of the airfoil body, and an intermediate group of flex elements disposed between the base group and the tip group with respect to the radial direction.

17. The turbine section as in claim 16, wherein each flex element in the base group of flex elements includes a base main portion and a base corner portion.

18. The turbine section as in claim 16, wherein the intermediate group of flex elements include trailing edge flex elements and leading edge flex elements.

19. The turbine section as in claim 16, wherein each flex element in the tip group of flex elements includes the main portion, the terminal portion, the arcuate portion.

20. The turbine section as in claim 18, wherein the impingement cooling structure further comprises a cross flex element positioned between the trailing edge flex elements and the leading edge flex elements in the intermediate group of flex elements, the cross flex element extending generally perpendicularly to each flex element in the intermediate group of flex elements.

* * * * *